United States Patent
Hong et al.

(10) Patent No.: US 8,184,120 B2
(45) Date of Patent: May 22, 2012

(54) FRAMEWORK FOR PROCESSING AND RENDERING LARGE VOLUME DATA

(75) Inventors: Wei Hong, Edison, NJ (US); Wei Li, Princeton, NJ (US)

(73) Assignee: Siemens Aktiengesellschaft, München (DE)

( * ) Notice: Subject to any disclaimer, the term of this patent is extended or adjusted under 35 U.S.C. 154(b) by 709 days.

(21) Appl. No.: 12/371,959

(22) Filed: Feb. 17, 2009

(65) Prior Publication Data

US 2009/0284537 A1    Nov. 19, 2009

Related U.S. Application Data

(60) Provisional application No. 61/054,200, filed on May 19, 2008.

(51) Int. Cl.
*G06T 17/00* (2006.01)
*G06T 15/00* (2011.01)
*G06T 15/04* (2011.01)

(52) U.S. Cl. ........................................ 345/424; 345/582

(58) Field of Classification Search ........................ None
See application file for complete search history.

(56) References Cited

U.S. PATENT DOCUMENTS

| 6,144,383 A * | 11/2000 | Lichtenbelt et al. | 345/419 |
| 2003/0174136 A1 * | 9/2003 | Emberling et al. | 345/531 |
| 2005/0264578 A1 * | 12/2005 | Engel et al. | 345/582 |

OTHER PUBLICATIONS

Kessenich et al., The OpenGL Shading Language, Language Version 1.10, p. 9.*
NVIDIA, NVIDIA CUDA Computer Unified Device Architecture, "Programming Guide," Version 1.0, p. 42.*
Optimizing GPU Volume Rendering, Ruijters, et al. Journal of WSCG, ISSN 1213-6964, vol. 14, http://wscg.zcu.cz/DL/wscg_DL.htm.

* cited by examiner

*Primary Examiner* — Jeffery A Brier
(74) *Attorney, Agent, or Firm* — Donald B. Paschburg

(57) ABSTRACT

Described herein is a system and method for facilitating large volume data processing and rendering. An exemplary system includes at least one processor coupled to a first memory, wherein the processor is configured to organize the large volume data in the first memory into one or more bricks. In addition, at least one graphics processing unit (GPU) is coupled to the processor and a second memory. The GPU is configured to process at least one or more bricks transferred from the first memory to the second memory to produce intermediate processing results, and to further render the intermediate processing results.

18 Claims, 3 Drawing Sheets

FRAMEWORK FOR PROCESSING AND RENDERING LARGE VOLUME DATA

CROSS REFERENCE TO RELATED APPLICATION

This application claims priority to U.S. Provisional Application No. 61/054,200, which was filed on May 19, 2008, and which is fully incorporated herein by reference.

TECHNICAL FIELD

This invention relates generally to the field of data processing and, more particularly, to processing and rendering large volume data.

BACKGROUND

Volumetric data processing and visualization play an important role in medical applications. Depending on the application, various visualization techniques may be employed. For example, direct volume rendering has been used for medical images, such as those acquired with magnetic resonance (MR), computed tomography (CT), positron emission tomography (PET), or any other medical tomographic scanner capable of producing a series of images in a grid-like array.

Many current medical applications demand high resolution volumetric data. The size of such data sets will likely keep increasing at a high rate due to the advance of scan technology. Recent technological advances in the field of tomographic imaging have greatly improved the spatial resolution and speed of data acquisition, resulting in the production of very large datasets composed of hundreds, and even thousands of images. For example, it is possible to rapidly generate a sequence of 1024 images using the Siemens SOMATOM VolumeZoom™ CT scanner, with each image being composed of a grid of 512×512 picture elements, resulting in a three-dimensional volume of 512×512×1024 volume elements (over 268 million data values).

Many toolkits have been proposed for processing and visualizing large volume datasets. For example, the National Library of Medicine Insight Segmentation and Registration Toolkit (ITK) is a software toolkit for performing registration and segmentation of images, while the Visualization Toolkit (VTK) is specifically designed for three-dimensional visualization. However, such toolkits typically handle data processing and rendering separately, and therefore do not allow for the visualization of intermediate results of data processing algorithms.

Direct visualization of segmented or registered data produced during data processing is essential to support doctors in diagnosing illnesses. Therefore, there is a need for a system that integrates data processing and rendering into a single framework to allow for efficient processing and rendering of large volume data and for real-time visualization of the progress of data processing algorithms.

SUMMARY

A system and method for processing and rendering large volume data is described herein. An exemplary system includes at least one processor coupled to a first memory, wherein the processor is configured to organize the large volume data in the first memory into one or more bricks. In addition, at least one graphics processing unit (GPU) is coupled to the processor and a second memory. The GPU may be configured to process at least one or more bricks transferred from the first memory to the second memory to produce intermediate processing results, and to further render the intermediate processing results.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present systems and methods and in order to meet statutory written description, enablement, and best-mode requirements. However, it will be apparent to one skilled in the art that the present systems and methods may be practiced without the specific exemplary details. In other instances, well-known features are omitted or simplified to clarify the description of the exemplary implementations of present systems and methods, and to thereby better explain the present system and methods. Furthermore, for ease of understanding, certain method steps are delineated as separate steps; however, these separately delineated steps should not be construed as necessarily order dependent in their performance.

The following description sets forth one or more implementations of systems and methods that facilitate a large volume data processing and rendering scheme. In one implementation, the data processing and rendering are integrated to efficiently process and render large volume data sets on the graphics processing unit (GPU). The exemplary framework is configurable to render intermediate results and allow the user to interactively visualize the progress of data processing algorithms in real-time. A bricking or partitioning technique may be used to efficiently handle large datasets that cannot be stored in the GPU memory. In one implementation, the bricking technique organizes the large datasets into one or more data bricks which are non-overlapping. The use of non-overlapping bricks avoids the duplication of data at the brick boundary, thereby advantageously reducing memory space requirements.

Figure 1:
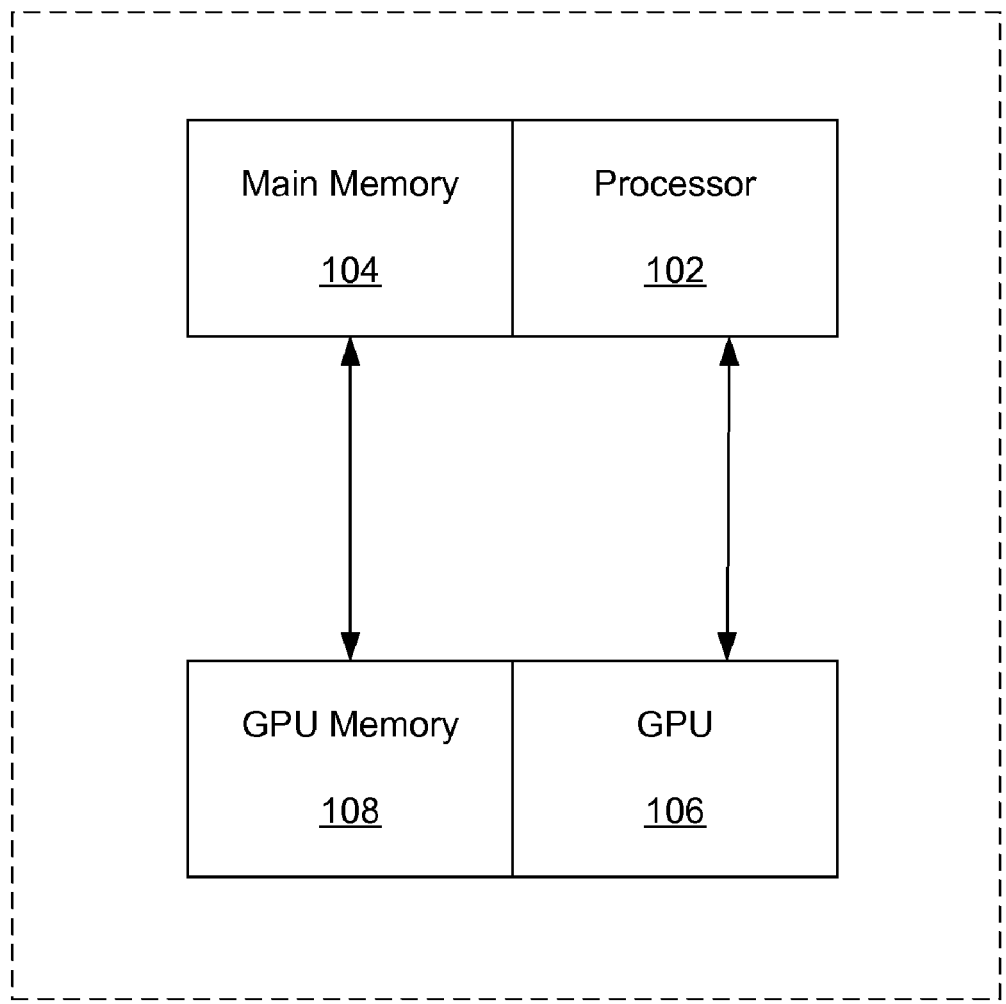
FIG. 1 illustrates an exemplary environment in which a data processing and rendering system may be implemented.

FIG. 1 illustrates an exemplary environment in which a large volume data processing and rendering scheme may be implemented. In particular, FIG. 1 shows a system 100 comprising a processor 102, a main memory 104, a graphics processing unit (GPU) 106 and a GPU memory 108. Additional, different or fewer components may be provided. For example, a hard drive, removable media, or other memory component may be provided in addition to or as a replacement for the memories 104 and 108 of the system 100. As another example, a user input, display, network, or network connection are provided, such as for networking with a medical imaging network or data archival system.

The system 100 may be part of a medical imaging system, such as a diagnostic or therapy ultrasound, x-ray, computed tomography, magnetic resonance, positron emission, or other system. Alternatively, the system 100 may be part of an archival and/or image processing system, such as one associated with a medical records database workstation. In other implementations, the system 100 may be a personal computer, such as a desktop or laptop.

Processor 102 is a single device or multiple devices operating in serial, parallel, or separately. Processor 102 may be a main processor of a computer, such as a laptop or desktop computer, a processor for handling some tasks in a larger system, such as in an imaging system, or a processor designed specifically for memory management. Processor 102 may be a central processing unit (CPU), such as a Pentium® or similar microprocessor. In one implementation, processor 102 is configured to efficiently manage large volume data. A partitioning or bricking technique may be used to handle large volume data sets exceeding available GPU memory 108, by sub-dividing the volume data into chunks or bricks. More details of the data management will be provided below.

GPU 106 operates as a co-processor of the main CPU 102 or host. GPU 106 may be a graphics accelerator chip, processor, application specific integrated circuit, analog circuit, digital circuit, accelerator card, or combinations thereof. In one implementation, GPU 106 is a personal computer graphics accelerator card or components, such as one manufactured by nVidia (e.g. Quadro FX 4500 or others), ATI (e.g. Radeon 9700 or others), or Matrox (e.g. Parhelia or others). GPU 106 may be viewed as a computing device capable of executing a very high number of threads in parallel. Data-parallel, computation-intensive portions of applications running on the processor 102 may be off-loaded onto GPU 106. A portion of an application that is executed multiple times, but independently on different data, may be isolated into a function that is executed on the GPU 106 as many different threads. To that effect, such a function is compiled to the instruction set of the GPU 106 and the resulting program (i.e. a kernel) is downloaded to the GPU 106.

GPU 106 is configured to process and render large volume data. Any type of data may be used for volume rendering, such as medical image data (e.g., ultrasound, x-ray, computed tomography, magnetic resonance, or positron emission). The rendering may be from data distributed in an evenly spaced three-dimensional grid, but may also be from data in other formats (e.g., rendering from scan data free of conversion to a Cartesian coordinate format or scan data including data both in a Cartesian coordinate format and acquisition format). GPU 106 may be configured to perform texture mapping with alpha blending, minimum projection, maximum projection, surface rendering, or other volume rendering of the data.

Main memory 104 comprises, for example, a random access memory, cache memory of the processor 102, or other memory devices for storing data or video information. GPU memory 108 comprises, for example, a parallel data cache or on-chip shared memory with very fast general read and write access. GPU memory 108 may be a video random access memory, a random access memory, or other memory device for storing data or video information. In one implementation, GPU memory 108 is a video random access memory of the GPU 106. Main memory 104 and GPU memory 108 are responsive to processor 102 and GPU 106 to store, transfer, and retrieve data. In one implementation, main memory 104 and GPU memory 108 are operable to store subsets or bricks of data. Each memory 104, 108 is a separate memory pool, such as any continuously addressed memory. Additional or alternative memories may be included, such as a hard drive, flash drive, optical, magnetic, or other now known or later developed memory.

GPU 106 and/or the GPU memory 108 may be included within the system 100 as part of a single system component, such as a medical diagnostic or therapy imaging system. Alternatively, GPU 106 and GPU memory 108 are provided separate from a data acquisition system, such as provided in a workstation or personal computer. The acquired data may be transferred wirelessly, over a computer network, or through a transferable storage medium to GPU 106.

Figure 2:
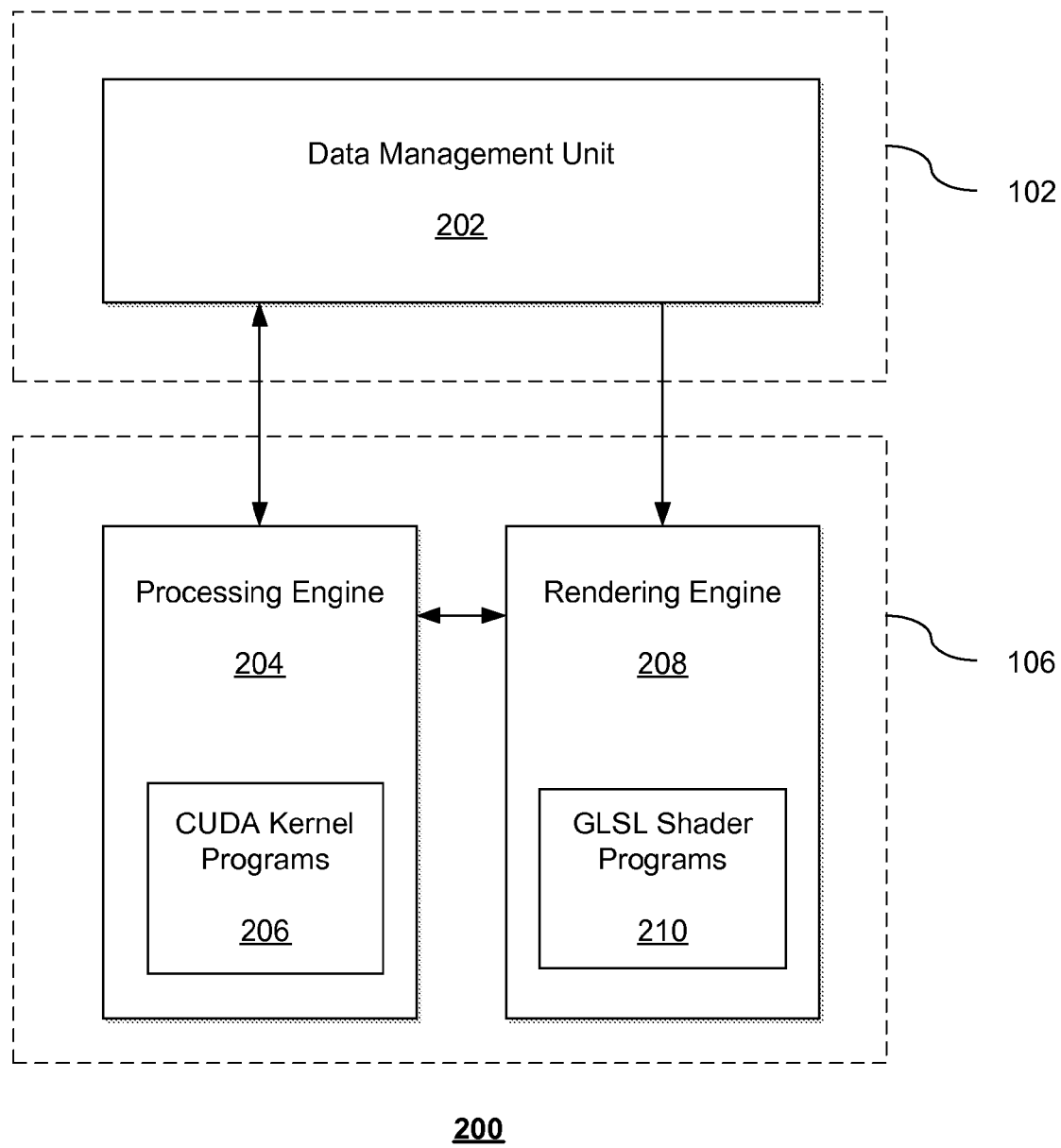
FIG. 2 illustrates a block diagram illustrating exemplary processor and GPU implementations.

FIG. 2 is a block diagram illustrating exemplary implementations of processor 102 and GPU 106. In the discussion of FIG. 2, continuing reference will be made to elements and reference numerals shown in FIG. 1. It is also noted that the various control units discussed herein may be implemented as any suitable hardware, firmware, and software, or any combinations thereof. As shown in FIG. 2, processor 102 implements a data management unit 202 to efficiently organize large volume data. GPU 106 implements a processing engine 204 for handling data processing and a rendering engine 208 for performing rendering algorithms.

Data management unit 202 may be configured to organize large volume data that exceeds a physical single-pass capacity of GPU memory 108. In one implementation, data management unit 202 uses a bricking technique to subdivide volume data into one or more bricks or sub-volumes. The bricks may represent linear, planar, or volume arrangements. For example, cubic bricks of voxels in 64×64×64 arrangements may be separated for storage. Tens, hundreds, or thousands of such bricks may be used for a single dataset. The bricks may have the same or different sizes. In addition, the bricks may be non-overlapping, as will be described in more details below.

Data management unit 202 manages storage of these bricks in order to optimize memory storage and efficiency. The bricks may be stored in main memory 104, and transferred to GPU memory 108 before rendering. Part of the volume data may also be cached in GPU memory 108. In addition, data may be transferred between the processing engine 204 and the rendering engine 208 through data copying within the GPU memory 108 to enable efficient data transfer and high performance. More details of the data transfer between the processing engine 204 and the rendering engine 208 will be provided below.

Hierarchical data structures may be used to organize the bricks in main memory 104. The hierarchical structure may be, for example, an octree, a quadtree or a binary space partitioning (BSP) tree. In one implementation, one or more octrees are generated and traversed by the data management unit 102. The octree may be traversed based on, for example, the visibility order. In one implementation, an octree structure corresponds to each brick. An octree node represents a sub-volume or cuboid part of the voxel volume, which can be divided into eight parts, each child node corresponding to each part of the voxel volume. Each node includes information associated with the corresponding sub-volume, such as the visibility factor, and/or minimum and maximum intensity values.

In one implementation, data management unit 202 organizes GPU memory 108 into multiple memory portions. The GPU memory allocation may be performed in response to a request by the processing engine 204 and rendering engine 208. The request may be sent anytime during, for example, rendering and/or processing. In one implementation, GPU memory 108 is divided into first, second and third memory portions. First memory portion may be allocated to store one or more data bricks. When the amount of data exceeds the available storage in GPU memory 108, bricks are swapped between GPU memory 108 and main memory 104. For example, if a requested brick is not resident in the GPU memory 108, it is loaded from the main memory 104. The bricks residing in the GPU memory 108 are swapped on, for example, a Least Recently Used (LRU) basis.

Second memory portion may be allocated to processing engine 204 for processing data. The size of second memory portion depends on the type of the type of data processing algorithms (e.g., segmentation, smoothing) implemented in the processing engine 204. Third memory portion may be allocated to rendering engine 208. For example, third portion may be used as the texture memory in OpenGL. Second and third memory portions may be small relative to the first memory portion because the processing engine 204 and the rendering engine 208 process and/or render a relatively small number of bricks at a time. In one implementation, rendering engine 208 renders only one brick at a time. Alternatively, in the case of fusing multiple sub-volumes, rendering engine 208 may require at least one brick for each sub-volume. The rendering brick may be generated on-the-fly by the processing engine 204. The ratio of sizes of first, second and third memory portions may be about, for example, 90:9:1. Other suitable memory allocations are also useful.

In addition, data management unit 202 may assign different priorities to identify memory portions that may be overwritten or swapped out when additional memory space is required. For example, first memory portion may be assigned the lowest priority since it is relatively large and thus more likely to contain unused space that may be swapped out. Third memory portion may be assigned the highest priority to avoid swapping out a relatively small memory space. Similarly, second memory portion may be assigned a high priority since it is relatively small. In one implementation, the priority is a range of numbers between 0.0 and 1.0. Three levels of priority are used, with 0.0 being a least priority. Other ranges and/or number of levels may be also used.

Therefore, if the second and/or third memory portions are not large enough for processing and/or rendering the data, data management unit 202 may free some space from the first memory portion and allocate the freed space to the second and/or third memory portions. In one implementation, the size of the third memory portion is fixed. Thus, only the processing engine 204 may request data management 202 to allocate more memory from the first memory portion to the second memory portion. For example, a processing algorithm implemented in the processing engine 204 may require access to data from a certain location of the volume. Before accessing the data, processing engine 204 may check to determine if the corresponding brick resides in the second memory portion. If not, processing engine 204 may send a request to data management unit 202 for additional memory allocation, and download the corresponding brick into the allocated memory. Alternatively, data management unit 202 may free the space allocated to one or more least used bricks to yield memory space.

In one implementation, GPU 106 implements a processing engine 204 for handling data processing and a rendering engine 208 to render the processing results. Data processing includes, for example, three-dimensional (3D) volume processing and two-dimensional (2D) image processing algorithms, such as gradient estimation, min/max computation, re-sampling and segmentation. Other types of data processing may also be performed.

In one implementation, processing engine 204 is implemented based on nVidia's Compute Unified Device Architecture (CUDA). Processing engine 204 includes, for example, one or more CUDA kernel programs 206 for processing the data. CUDA is designed for issuing and managing computations on the GPU as a data-parallel computing device without the need of mapping them to a graphics application programming interface (API). CUDA is described in "NVIDIA CUDA Compute Unified Device Architecture Programming Guide Version 0.8" (Feb. 12, 2007), which is hereby incorporated by reference for all purposes. It should be noted, however, that other compilers or development tools may also be used to implement the processing engine 204. For example, the processing engine 204 may be implemented based on a parallel programming framework such as the Open Computing Language (OpenCL).

Processing engine 204 processes the data to generate processing results. The processing results are then sent to rendering engine 208 for rendering. The processing results may not necessarily be the final results of the processing algorithm after it is completed. For example, the processing results may be the intermediate results produced by the processing algorithm (e.g., segmentation algorithm) before it is completed. By rendering the intermediate results, the present framework enables the user to interactively visualize the progress of the processing algorithm in real time.

As discussed previously, the processor 102 may organize the volume data into bricks. Therefore, since the data is stored in bricks, the processing algorithms performed by processing engine 204 and the rendering algorithms performed by rendering engine 208 are also brick-based. Due to the discrete nature of the bricks, however, artifacts may be produced at the boundary between the bricks if it is not corrected by interpolation (e.g., convolution kernel). In order to perform interpolation, the rendering engine 208 may require access to data contained in neighboring bricks. In conventional systems, the bricks stored in the memory have an overlap to ensure proper interpolation during rendering. However, such conventional systems are inefficient particularly in terms of memory requirements since data at the boundary between neighboring bricks have to be duplicated and stored in memory. This memory overhead is especially significant for large volume data sets.

In one implementation, instead of storing overlapping bricks in the memory, the processing engine 204 is configured to generate the brick boundary dynamically (i.e. on-the-fly) before sending the boundary and the brick containing the processing results to the rendering engine 208 for rendering. Since the data at the boundary between any two neighboring bricks need not be duplicated and stored in memory, this implementation advantageously requires far less memory space than conventional techniques.

To generate the boundary of the brick currently being processed, the processing engine 204 (e.g., CUDA kernel program 206) may access its neighboring bricks cached in, for example, the first or second portions of the GPU memory. Where cubic bricks are used, for example, the CUDA kernel program 206 may access all 26 neighboring bricks of the currently processed brick. The availability of the neighboring bricks, however, may depend on the position of the currently processed brick in the volume data set. In situations when the currently processed brick is at the volume boundary, for example, not all the neighboring bricks are available. An empty brick representing the missing neighbor may then be passed to the CUDA kernel program 206. If the rendering engine 208 requires gradient data, processing engine 204 may also apply the gradient calculation kernel to the data.

In one implementation, the size of the rendering brick stored in the third memory portion is larger than the size of the processing brick stored in the second memory portion. The larger rendering brick size may be used to accommodate at least one processing brick and its respective boundary voxels required for interpolation. The boundary voxels may be copied from multiple processing bricks into the rendering brick.

Rendering engine 208 may be implemented based on the OpenGL graphics system. Rendering engine 208 includes, for example, one or more OpenGL Shading Language (GLSL) shader programs 210. The OpenGL graphics system is a software interface to graphics hardware, and is described in, for example, the OpenGL Programming Guide, The Official Guide to Learning OpenGL, Second Edition, Release 1.1, by the OpenGL Architecture Review Board, Jackie Neider, Tom Davis, Mason Woo, Addison-Wesley Developers Press, Reading, Mass. 1997, which is herein incorporated by reference for all purposes. OpenGL advantageously enables rendering of surface based geometry objects, together with volume objects, with hardware acceleration. It is to be noted that other graphics systems, such as other graphics APIs (e.g., Direct3D) or general purpose GPU API/libraries (e.g., CUDA or OpenCL) may also be used to implement the rendering engine 208.

In one implementation, the processing results are rendered using a GPU-based ray-casting algorithm. Ray-casting is a method for direct volume rendering, which can be viewed as a straightforward numerical evaluation of the volume rendering integral which sums up optical effects, such as color and opacity, along viewing rays. Other types of rendering techniques may also be used. The GLSL shader programs 210 may be configured to perform the ray-casting algorithm, and to provide different rendering features and/or use different input data. For example, within the same rendering pass, the input data for different bricks from the processing engine 204 may be different. Some bricks may have a segmentation mask, while other bricks may not. Thus, the rendering engine 208 may select the corresponding GLSL shader programs based on, for example, the input data and the required rendering features.

In addition, the rendering engine 208 may be configured to perform other general volume visualization algorithms, for example, minimum intensity projections (MinIP) and maximum intensity projections (MaxIP). The processing engine 204 may be configured to apply post processing on the rendering results from the rendering engine 208. Examples of post processing algorithms include smoothing or sharpening to improve the quality of the image.

One advantage of the present framework is the low cost of communicating the processing results between the processing engine 204 and the rendering engine 208. In one implementation, the processing results are stored in the GPU memory shared between processing engine 204 and rendering engine 208. The bandwidth of the GPU memory is very high, typically over 100 GB/s. By maintaining the processing and rendering engines (204, 208) within the same processing device (GPU) and sharing the same GPU memory, the cost of communicating the processing results between the processing engine 204 and the rendering engine 208 is advantageously low.

For example, where the processing engine 204 is implemented based on nVidia's Compute Unified Device Architecture (CUDA) and the rendering engine 208 is implemented based on OpenGL, data communication between processing engine 204 and rendering engine 208 may be implemented using the OpenGL pixel buffer object (PBO). Processing results from processing engine 204 may be copied into a PBO and transferred to rendering engine 208 for rendering by OpenGL. The OpenGL PBO may be mapped into the address space of CUDA, either to enable CUDA to read data written by OpenGL or to enable CUDA to write data for processing by OpenGL.

The exemplary framework described herein is flexible enough to implement a wide variety of medical applications. For example, an automated virtual colonoscopy system may be implemented using the exemplary framework to visualize the progress of a parallel region growing algorithm for colon segmentation in real-time. One major advantage of the framework is that data processing algorithms may be efficiently implemented, and the intermediate and final processing results can be directly visualized. For example, segmentation algorithms may be implemented and the segmentation process may be interactively visualized. These features are especially advantageous for medical applications, which require the handling of high resolution volume data.

Figure 3:
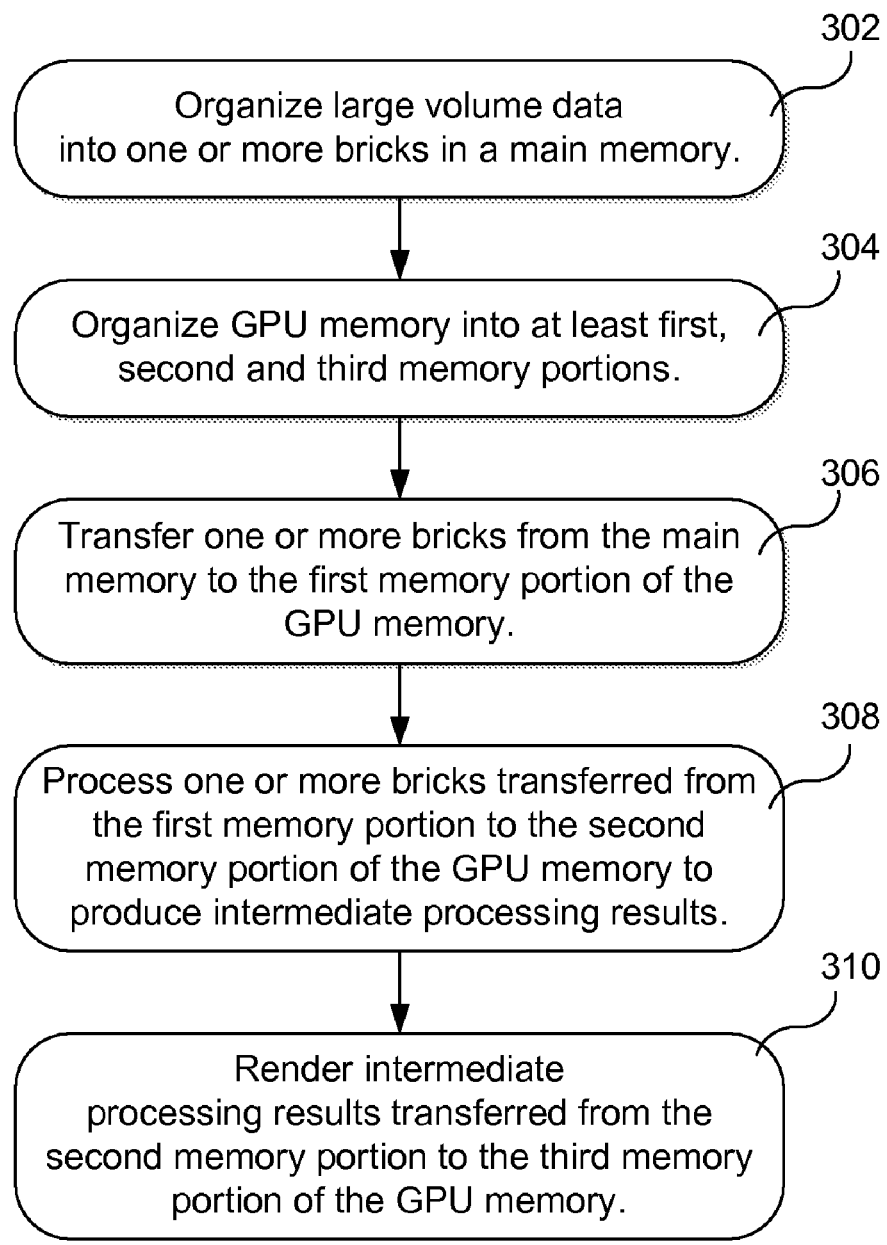
FIG. 3 illustrates an exemplary method of processing and rendering large volume data.

FIG. 3 depicts a methodological implementation of system 100. This methodological implementation may be performed in software, hardware, or a combination thereof. In the discussion of FIG. 3, continuing reference will be made to elements and reference numerals shown in FIGS. 1-2.

Referring to FIG. 3, an exemplary method 300 of processing and rendering large volume data is illustrated. At 302, processor 102 organizes large volume data which may exceed the physical single-pass capacity of GPU memory 108. This may be done using, for example, the bricking technique to subdivide the volume data into one or more bricks. The one or more bricks are stored in main memory 104 and may be organized by the processor 102 using, for example, octrees or any other multi-level data structures. In one implementation, the bricks are non-overlapping.

At 304, processor 102 organizes GPU memory 108 into multiple portions. In one implementation, processor 102 organizes the GPU memory 108 into at least first, second and third memory portions. First memory portion may be allocated, for example, to store one or more data bricks swapped from main memory 104. Second memory portion may be allocated, for example, to processing engine 204 for processing data. Third memory portion, for example, may be allocated to rendering engine 208 to be used as, for example, texture memory.

In addition, processor 102 may assign different priorities to the memory portions to identify portions that may be overwritten or freed up when additional memory space is required. For example, first memory portion (used to store bricks) may be assigned the lowest priority. Processor 102 may reallocate freed up space in first memory portion to processing engine 204 or rendering engine 208 in response to a request for additional space.

At 306, one or more bricks are transferred from the main memory 104 to a first portion of the GPU memory 108. Since GPU 106 processes the data brick by brick, the required temporary storage space in the GPU memory 108 is only allocated for the one or more bricks and but not the whole volume.

At 308, one or more bricks transferred from the first memory portion to a second memory portion of the GPU memory are processed by the processing engine 204 of the GPU 106 to generate processing results. The processing results include intermediate processing results produced by processing algorithms before completion. Processing includes, for example, performing three-dimensional (3D) volume processing and two-dimensional (2D) image processing algorithms, such as gradient estimation, min/max computation, re-sampling and segmentation. Other types of data processing may also be performed.

In one implementation, neighboring bricks stored in the main memory 104 and GPU memory 108 are non-overlapping. In order to ensure correct interpolation, the processing engine 204 may generate the boundary between the currently processed brick and the neighboring bricks before sending the boundary and the processing results to the rendering engine 208 for rendering. The processing engine 204 may generate the brick boundary dynamically or on-the-fly. The processing engine 204 may access the neighboring bricks cached in, for example, the first or second portions of the GPU memory, to generate the brick boundary. In one implementation, the dynamic boundary generation is performed by CUDA kernel program 206.

At 310, the intermediate processing results transferred from the second memory portion to the third memory portion are rendered by the rendering engine 208 of the GPU 106. Rendering includes, for example, performing ray-tracing and other visualization techniques. In one implementation, GLSL shader programs 210 are used perform the rendering. GLSL shader programs 210 may provide different rendering features and/or use different input data. In one implementation, the processing engine 204 is further configured to apply post processing on the rendering results from the rendering engine 208.

An implementation of the large volume data processing and rendering method 300 may be described in the general context of processor-executable instructions, such as event modules, executed by one or more computers, or other devices or processors. Generally, program modules include routines, programs, objects, components, data structures, etc., that perform particular tasks or implement particular abstract data types. Typically, the functionality of the program modules may be combined or distributed as desired in various embodiments.

An implementation of the large volume data processing and rendering method 300 may be stored on some form of processor storage media. Processor storage media may be any available media that may be accessed by a processor, including volatile and non-volatile, removable and non-removable media implemented in any method or technology for storage of information such as processor readable instructions, data structures, program modules, or other data. Processor storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A system for processing and rendering large volume data comprising:
   at least one processor coupled to a first memory, wherein the processor is configured to organize the large volume data in the first memory into one or more non-overlapping bricks; and
   at least one graphics processing unit (GPU) coupled to the processor and a second memory,
   wherein the second memory is configured to store one or more bricks transferred from the first memory,
   wherein the GPU is configured to process the one or more bricks to produce intermediate processing results, including dynamically generating a boundary of a brick for interpolation, wherein the GPU is further configured to render the intermediate processing results.

2. The system of claim 1 wherein the processor is further configured to organize the bricks in the first memory using a hierarchical data structure.

3. The system of claim 1 wherein the processor is further configured to organize the second memory into first, second and third portions in response to a request from the GPU.

4. The system of claim 3 wherein the first portion of the second memory is configured to cache the one or more data bricks transferred from the first memory.

5. The system of claim 3 wherein the second portion of the second memory is configured to store at least one brick for processing by the GPU.

6. The system of claim 3 wherein the third portion of the second memory is configured to store at least one brick containing the processing results for rendering by the GPU.

7. The system of claim 6, wherein the GPU accesses neighboring bricks cached in the first or second portions of the GPU memory to dynamically generate the brick boundary for interpolation.

8. The system of claim 3 wherein the second and third portions of the second memory are small relative to the first portion of the second memory.

9. The system of claim 8 wherein the processor is further configured to assign priorities to the first, second and third portions of the second memory to identify portions that may be overwritten if additional memory space is required.

10. The system of claim 8 wherein the processor is further configured to allocate more memory from the first portion to the second portion of the second memory in response to a request from the GPU.

11. The system of claim 8, wherein a size of a rendering brick stored in the third memory portion is larger than a size of a processing brick stored in the second memory portion.

12. The system of claim 3 wherein the GPU includes a processing engine for processing the one or more bricks to produce intermediate processing results, and a rendering engine for rendering the intermediate processing results, wherein processing results are stored in the second memory shared between the processing engine and the rendering engine.

13. The system of claim 12 wherein the second portion of the second memory is allocated to the processing engine for processing data.

14. The system of claim 12 wherein the third portion of the second memory allocated to the rendering engine for rendering data processed by the processing engine.

15. A method of processing and rendering large volume data comprising:
   (a) organizing, by a processor, the large volume data into one or more non-overlapping bricks and storing the one or more bricks in a first memory coupled to the processor;
   (b) organizing, by the processor, a second memory coupled to a GPU into at least first, second and third memory portions;
   (c) transferring, by the processor, one or more bricks from the first memory to the first memory portion of the second memory;
   (d) processing, by the GPU, one or more bricks transferred from the first memory portion to the second memory portion of the second memory, including dynamically generating a boundary of a brick for interpolation, to produce intermediate processing results; and
   (e) rendering, by the GPU, the intermediate processing results transferred from the second memory portion to the third memory portion of the second memory.

16. The method of claim 15 further comprising:
(f) assigning, by the processor, priorities to the first, second and third memory portions of the second memory to identify portions that may be overwritten if additional memory space is required.

17. A non-transitory program storage media readable by a computer, tangibly embodying a program of instructions executed by the computer to perform the method steps for processing and rendering large volume data, the method comprising the steps of:
(a) organizing large volume data into one or more non-overlapping bricks and storing the one or more bricks in a first memory coupled to a processor;
(b) organizing a second memory coupled to a GPU into at least first, second and third memory portions;
(c) transferring one or more bricks from the first memory to the first memory portion of the second memory;
(d) processing one or more bricks transferred from the first memory portion to the second memory portion of the second memory, including dynamically generating a boundary of a brick for interpolation, to produce intermediate processing results; and
(e) rendering the intermediate processing results transferred from the second memory portion to the third memory portion of the second memory.

18. The computer readable program storage media of claim 17, the method further comprising:
(f) assigning, by the processor, priorities to the first, second and third memory portions of the second memory to identify portions that may be overwritten if additional memory space is required.

\* \* \* \* \*